United States Patent [19]

Dürselen et al.

[11] 4,202,735
[45] May 13, 1980

[54] PROCESS FOR OPERATING COKING OVENS AND AN OVEN FOR USE IN SAID PROCESS

[75] Inventors: Heinz Dürselen, Essen-Überruhr; Franz-Josef Onnebrink; Arnulf Schüffler, both of Essen, all of Fed. Rep. of Germany

[73] Assignee: Krupp-Koppers GmbH, Essen, Fed. Rep. of Germany

[21] Appl. No.: 894,848

[22] Filed: Apr. 10, 1978

[30] Foreign Application Priority Data

Apr. 20, 1977 [DE] Fed. Rep. of Germany ....... 2717499

[51] Int. Cl.² ........................... C10B 5/12; C10B 5/20
[52] U.S. Cl. ...................................... 201/41; 202/140; 202/141; 202/151; 432/180
[58] Field of Search ............. 201/41, 44; 202/141, 202/142, 143, 144, 140, 151; 432/180, 181

[56] References Cited

U.S. PATENT DOCUMENTS

| | | | |
|---|---|---|---|
| 3,170,850 | 2/1965 | Bonnett | 202/141 |
| 3,183,175 | 5/1965 | Breitbach et al. | 202/141 X |
| 3,196,086 | 7/1965 | Wethly | 202/144 X |
| 3,252,872 | 5/1966 | Grumm | 202/141 |
| 4,039,391 | 8/1977 | Gensler | 202/144 X |
| 4,064,017 | 12/1977 | Beck et al. | 201/44 X |

*Primary Examiner*—Arnold Turk
*Attorney, Agent, or Firm*—Michael J. Striker

[57] ABSTRACT

In a coking operation where the heating medium is introduced into the furnace by way of a bottom fire box and wherein heat exchangers are provided for the waste gases, the waste gas is passed through a plurality of parallel channels serving as said heat exchangers and the useful portion of the total system available for such exchange is reduced when the coking time is increased beyond the time required at normal operation.

10 Claims, 8 Drawing Figures

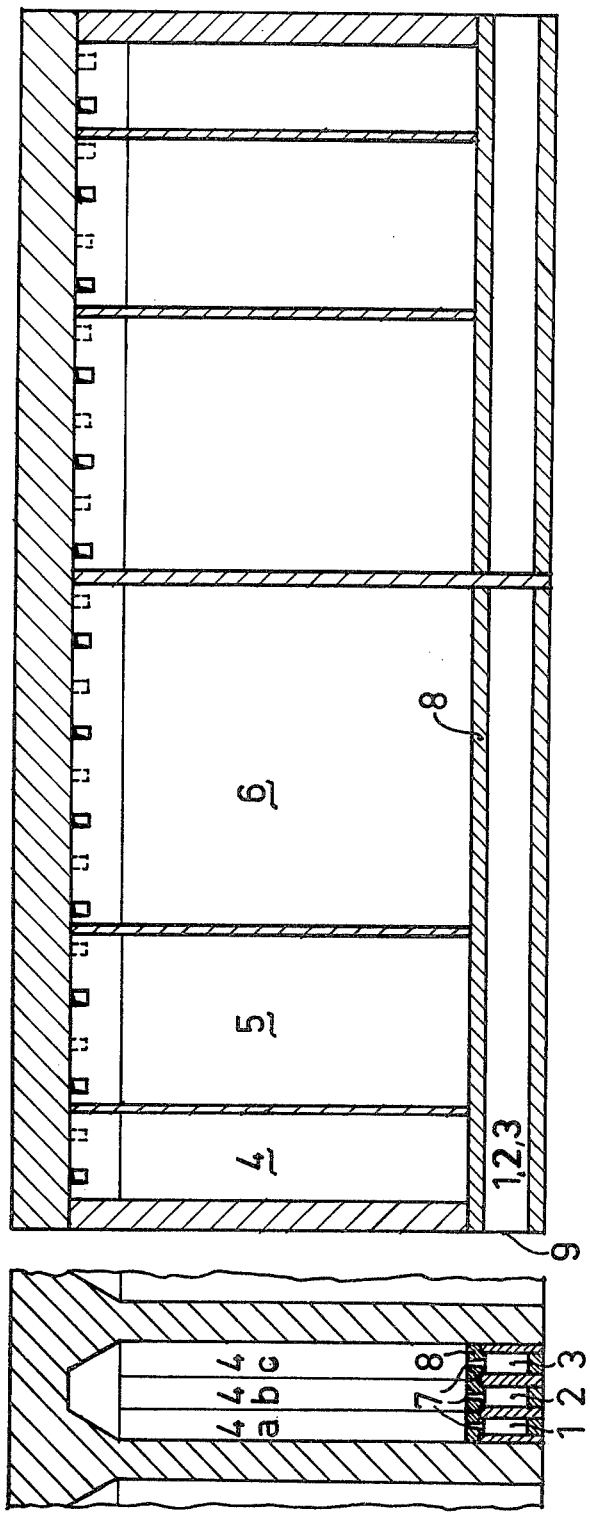

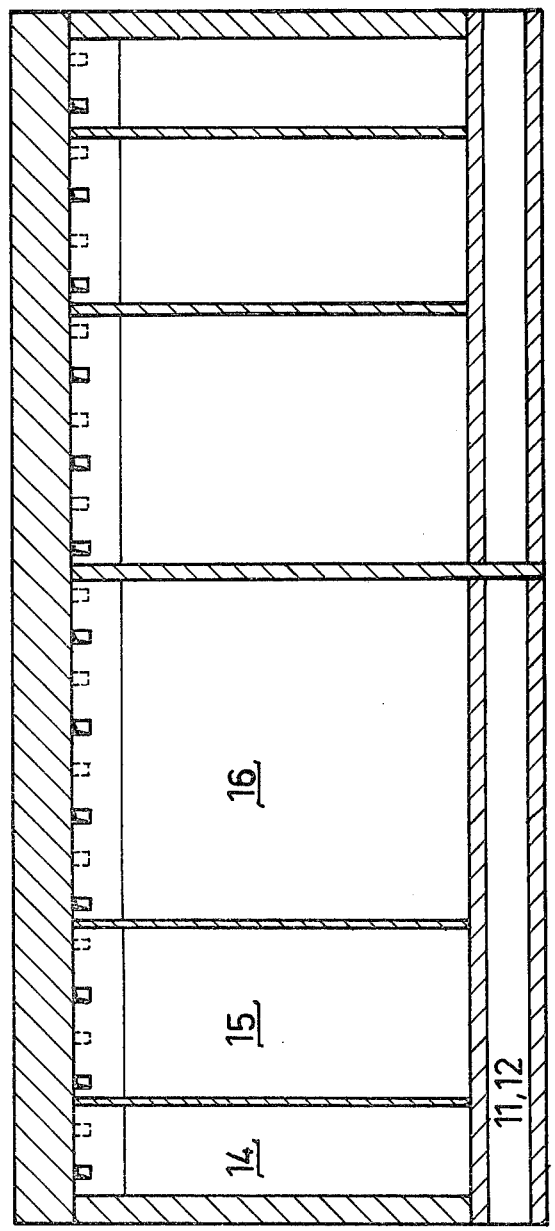
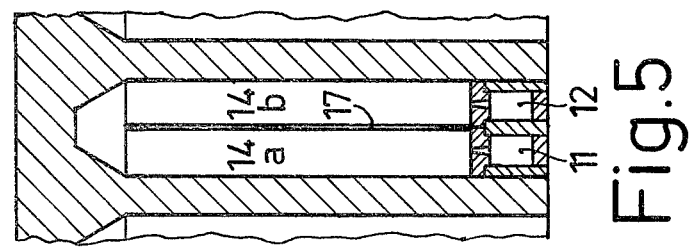
Fig.6
Fig.5

PROCESS FOR OPERATING COKING OVENS AND AN OVEN FOR USE IN SAID PROCESS

BACKGROUND OF THE INVENTION

The invention relates to a process for operating coking ovens and to an oven for use in such process.

The general type of coking oven used in the invention has a bottom fire box and heat exchangers for the waste gases which are divided in a plurality of parallel channels.

The heat exchangers of this type of coking oven batteries are usually regenerators. However, the invention is applicable also if recuperators are used as heat exchangers instead of the regenerators.

It is already known to divide such coking regenerators into different sections which are fed by individual heating ducts or groups of heating ducts.

It is also known in case of regenerator type horizontal coking ovens to provide the inlet and outlet sections of the different regenerator portions with regulating devices. However, these devices in the prior art had the purpose only to adequately distribute the flowing medium to the individual sections in order, from the point of view of heating technology, to put them to fully effective use.

The layout and arrangement for heating exchangers for coking ovens is usually based on the intended coking time, that is the time which is necessary to complete the coking of the coal introduced into the oven as the feed material. The heating exchangers in these cases are designed in a way that an optimum recovery of the sensible heat in the waste gas is accomplished for a specific coking time. However, frequently a lengthening of the coking time is necessary. This is for instance the case where the production of a coking battery must be throttled down or one oven of the battery of ovens is shut off. A lengthening of the coking time, unfortunately, has the consequence that the waste gas temperature at the outlet of the heat exchanger is reduced to a level below the acceptable temperature limit. To avoid this conflict it was necessary in the prior art to adjust the heat exchanger to higher waste gas temperatures than would have been desirable for optimum use, that is, one had to accept more or less large losses of heat in case of normal coking time.

The invention therefore has the object to provide for a process and product which makes it possible to obtain a substantially equally favorable utilization of the waste gas heat at different coking times.

SUMMARY OF THE INVENTION

According to the invention the waste gas is passed through a plurality of parallel channels serving as heat exchangers and the useful portion of the total areas available for such heat exchange is reduced when the coking time is increased.

More specifically, the invention contemplates the division of the plurality of parallel heat exchange channels into disk-like segments extending longitudinally of the oven. Each of these disks, or several of them, or all of them, may be designed to fully meet the heat and flow requirements of the oven.

The variation of the useful portion of the heat exchanger surfaces is accomplished by regulating the inlet cross section or outlet cross section of the individual disks, preferably on the cold side thereof, by means of throttle or shutoff devices. Thus, it is then possible if desired to withdraw disks while remaining hot from the operation, and to charge only the still open disks with the gas. The useful portion of the heat exchanger surfaces thus can be reduced in case of a lengthening of the coking time without complicated apparatus. The reduction of the useful portion of the heat exchanger can be effected stepwise or, if desired, also by continuous infinite variation.

It is within the concept of the invention also to provide for a different division into individual disks in the top heating ducts than in the other parts of the oven, and also to provide for a correspondingly varied plan of operation, since in case of an increase of the coking time the heating requirement in these top ducts increases more because of the oven wall losses. For instance, the division may be effected in the top ducts into four sections, while in the other parts of the oven only three sections may be provided.

In ovens which are heated by means of regenerators, the variation of the waste gas temperature can increase during a reversal period in case of long coking times and only partial heat exchanger surface utilization. This result can be compensated by shortening of the reversal or switchover period and, if desired, an overcompensation may also be possible.

It is furthermore possible to use as part of the invention intermittent heating which is known as such. With this device the heating phases are interrupted by periods of intermission. Thus, the usefulness of the invention can be still further increased insofar as the applicable time periods are concerned.

It is furthermore contemplated that the useful portion of the heat exchanger surfaces may be subject to a reduction at half-time of the cycle or as soon as the waste gas temperature has dropped below an acceptable minimum temperature due to the increase of the coking time. It will also be understood that the so-called useful portions of the heat exchanger surfaces as between different heat exchangers, may either have the same size of heat exchange surfaces or surfaces of different extent.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

In the drawings

FIGS. 3 and 4 are a cross section and a longitudinal section through one embodiment of a regenerator as used in the process of the invention, FIG. 3 illustrating a cross section taken perpendicularly to the longitudinal section of FIG. 4;

FIGS. 5 and 6 are a cross section and a longitudinal section of another embodiment of such regenerator, FIG. 5 illustrating a cross section taken perpendicularly to the longitudinal section of FIG. 6.

DETAILS OF THE INVENTION AND PREFERRED EMBODIMENTS

Figure 1:
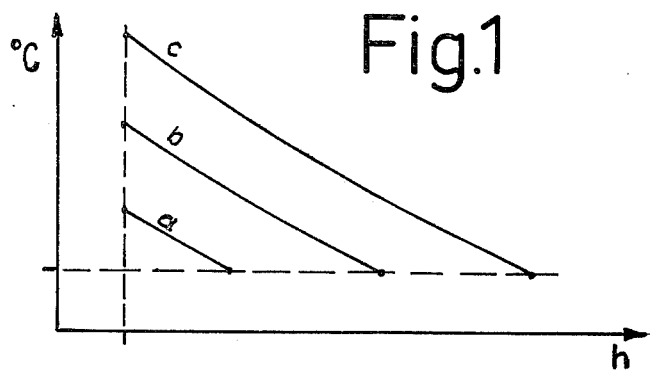
FIG. 1 is a diagram showing the relationship of waste gas temperature and coking time in prior art coking oven regenerators.

FIG. 1 illustrates the necessity as it existed in the prior art for a compromise when designing a coke oven generator.

The curves a, b and c show the interrelation between the waste gas temperature at the elbow bend (vertical axis) and the operating time of the oven (horizontal axis). If the regenerator is designed according to curve a to have a low heat loss at a normal coking time (standard operation) and thus to provide maximum economy, the acceptable lower temperature limit at the elbow which, for instance, may be 180° C., will already be reached at only a small extension of the coking time. This is the temperature limit where condensation or inadequate stack draft appear. On the other hand if the design takes into account the possibility of a longer coking time, as for instance illustrated by curves b or even c, a much higher waste heat loss must be accepted in case of normal operation.

The invention avoids this compulsory compromise. It permits to operate the coke oven at normal output with a minimum loss of waste gas heat and still to preserve a large range of variation for the oven performance.

Figure 2:
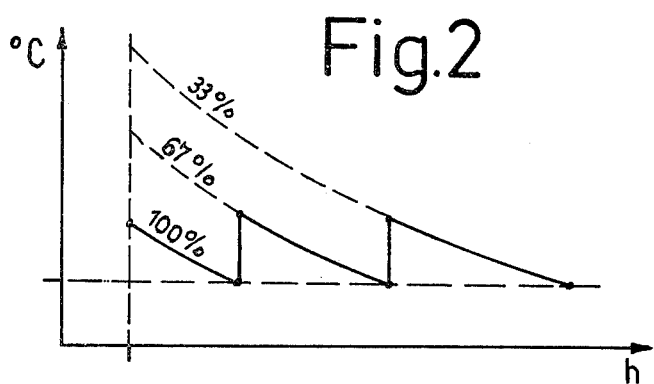
FIG. 2 is a similar diagram for the regenerators operated according to the process of the present invention.

FIG. 2 shows how the mean waste gas temperature of the oven drops with increased coking time at 100% utilization of the heat exchanger surface. When in this case the permissible lower waste gas temperature limit is reached, a portion of all heat exchanger surfaces, for instance one-third, is just withdrawn from operation. The waste gas temperature will then increase but will drop at still further extension of the coking time to a new heat technological characteristic. If then the acceptable lower waste gas temperature limit is again reached, a further third of the heat exchange surfaces may be withdrawn from operation and the coking time can thus be further extended.

With reference to FIGS. 3 and 4 it will be seen that the bottom channel for the introduction of air or dilute gas or for the discharge of the waste gas is divided in three parallel channels 1, 2 and 3. These channels are connected with the superimposed regenerator sections 4, 5 and 6 by means of a plurality of passages 7 in the grate 8. Thus, a rather uniform charge of the cross section of the individual regenerator portions is effected.

This assumes that the lining of the regenerator sections consists of jacket bricks which form parallel extending vertical channels so as to substantially prevent a distribution of the flowing gas within the lining.

The introduction of air to the central channel 2 can then be discontinued by means of a shutoff device (not shown) which is disposed within the area where the bottom channel ends. Thus, air flow is also discontinued to the central disk-like area, for instance area 4b of the regenerator portion above the individual channel. This means that the useful heat exchanger surface now consists only of the disk-like areas 4a and 4c which extend in the longitudinal direction of the regenerator and are located above the individual channels 1 and 3. A further reduction of the useful heat exchanger surface is of course possible if the channel 1 or 3 are also locked.

The embodiment of FIGS. 5 and 6 is distinguished from that of FIGS. 3 and 4 in the first place by the fact that the bottom channel is divided in two subchannels 11 and 12. The regenerator sections 14, 15 and 16 furthermore are divided by a central wall into for instance subsections 14a and 14b, the central wall extending the full height of the oven lining. By closing the gas inlet or gas discharge to one of the subchannels 11 or 12, one-half of the available heat exchanger surface may be eliminated.

Figure 8:
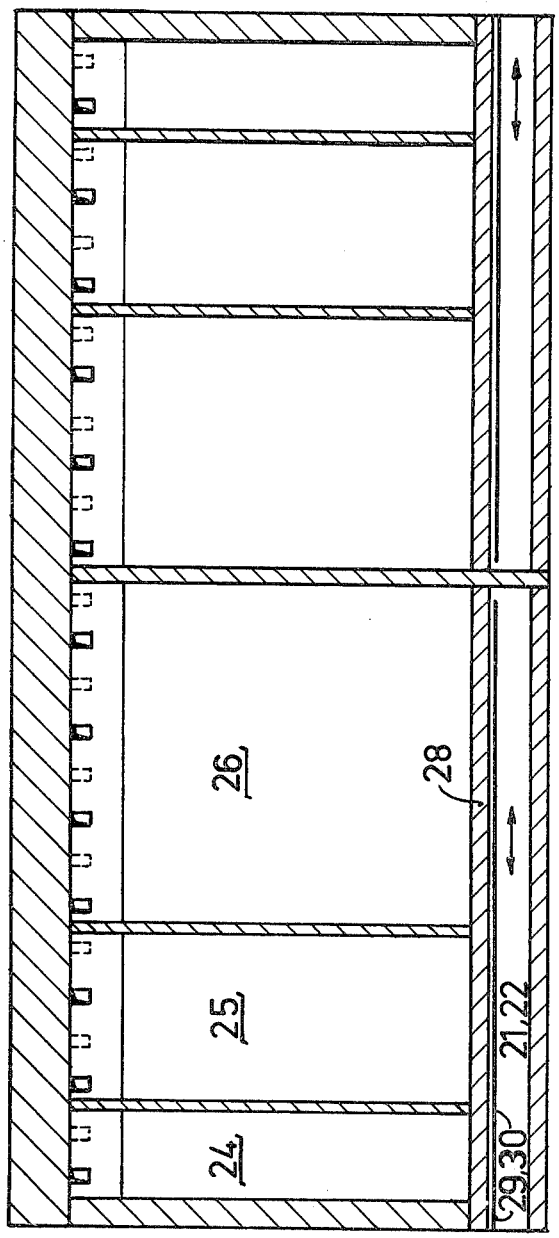
FIGS. 7 and 8 are a cross section and longitudinal section through a third embodiment of a regenerator as used in the process of the invention, FIG. 7 illustrating a cross section taken perpendicularly to the longitudinal section of FIG. 8.
Figure 7:
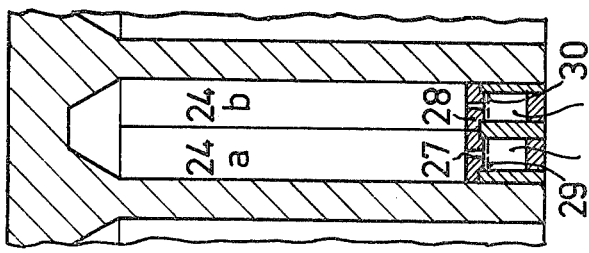

FIGS. 7 and 8 show an embodiment with also two subchannels 21 and 22. In this case there are provided below the grate 28 perforated plates 29 and 30 which are movable in longitudinal direction. The perforations in these plates are spaced in the same way as the openings 27 of the grate 28. By moving the plates there can thus be obtained a throttling or complete shut-off of the gas inlet through the perforations 27. Thus, the charge of the regenerator sections, for instance 24a and 24b which are provided above the subchannels 21 and 22 can be varied.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A process for operating a coking oven or a group of coking ovens wherein heating medium is furnished to the oven chambers from a bottom fire box of boxes and wherein regenerators or recuperators provide heat exchangers for waste gas, diluted gas or hot air, said process comprising passing the flow of waste gas or diluted gas or hot air through a plurality of parallel flow channels constituting the heat exchange surfaces of each regenerator or recuperator and reducing the portion of the total surfaces available for heat exchange in case of an extension of the coking time by throttling or shutting off the flow to at least one of said channels while operating the oven at normal output and adjusting the degree of said reduction of heat exchange surface to the degree of extension of coking time, whereby an excessive lowering of the temperature of discharged waste gas or air may be avoided.

2. The process of claim 1 wherein said reduction is effected when the production of one oven of a battery of coke ovens is turned down.

3. The process of claim 1 wherein said reduction is effected when the temperature of the waste heat because of an extension of the coking time drops below the required minimum temperature.

4. The process of claim 1 wherein said reduction is carried out in a gradual uninterrupted manner.

5. The process of claim 1, said exchangers each having a cold side and a hot side, and wherein the said reduction is effected on the cold side of the heat exchangers.

6. The process of claim 1 wherein periodic heat interruptions are effected.

7. The process of claim 1 wherein the half time of the heating period is reduced in duration by extension of the coking time and regenerative heating of the coking oven.

8. In a coking oven wherein the heating medium is furnished to the oven from a bottom firebox and which is provided with regenerators or recuperators having heat exchange surfaces for the waste gas or hot air, each regenerator or recuperator being divided into a plurality of parallel heat exchange channels, wherein the improvement comprises providing at least one of said channels within each recuperator or regeneratr with separate throttles or shutoff devices for the waste gas or air.

9. The coking oven of claim 8 wherein said parallel channels provide heat exchange surfaces of identical extent.

10. The coking oven of claim 8 wherein said parallel channels provide heat exchange surfaces of different extent.

* * * * *